3,432,603
PROCESS FOR WEIGHT REDUCTION
Bernard L. Zenitz, Colonie, N.Y., assignor to Sterling Drug Inc., New York, N.Y., a corporation of Delaware
No Drawing. Filed Oct. 19, 1964, Ser. No. 404,958
U.S. Cl. 424—325          13 Claims
Int. Cl. A61k 17/00

This invention relates to a process for using compositions of matter classified in the art of chemistry as hydroxylated N-alkylamines.

The invention sought to be patented, in its process aspect, is described as residing in the concept of using the tangible embodiment of a composition of matter containing a chemical compound having a molecular structure in which there is attached, to the nitrogen atom of a 1,3-dihydroxy-2-lower-alkyl-2-pyropylamine or 1,3-dihydroxy-2-hydroxymethyl-2-propylamine, at least one alkyl group, said compound having a total of between 14 and 27 carbon atoms, inclusive, by administering to mammals such composition as the essential active ingredient of a pharmaceutical formulation for weight reduction in mammals.

The hydroxylated secondary and tertiary amines useful in practicing my invention are represented by the following structural formula:

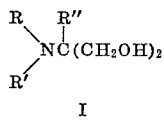

I wherein R represents a hydrogen atom or lower-alkyl radical, R' represents an alkyl radical of from ten to 16 carbon atoms, R" represents a lower-alkyl or hydroxymethyl radical, and the sum of the number of carbon atoms in R, R', and R" is between 11 and 24, inclusive. Particularly preferred compounds are those where the total carbon content of the groups R, R', and R" is between 12 and 20, inclusive.

The exact nature of the alkyl radicals represented by R, R', and R" is not critical, the only critical feature being the total carbon content of the molecule. Thus R', as an alkyl radical, can by any of such straight chained or branch chained groups as decyl, 3-methyldecyl, undecyl, dodecyl, tridecyl, tetradecyl, hexadecyl, and the like. R and R", in representing a lower-alkyl radical, preferably has from one to about four carbon atoms, and thus can be any of such radicals as methyl, ethyl, propyl, isopropyl, butyl, isobutyl, and the like. A particularly preferred class of compounds are those in which R", when lower-alkyl, represents the methyl or ethyl radicals.

The manner and process of making and using the invention will now be generally described, so as to enable a person skilled in the art of chemistry to make and use the same, as follows:

The aforesaid compounds of Formula I, where R is hydrogen, can be prepared by direct alkylation of a 1,3-dihydroxy-2-lower-alkyl-2-propylamine

[H₂NC(R")(CH₂OH)₂

R" is lower-alkyl] or a 1,3-dihydroxy-2-hydroxymethyl-2-propylamine [H₂NC(R")(CH₂OH)₂, R" is hydroxymethyl]. The latter is heated with an alkyl ester, R'X, where X is the anion of a strong acid, in the presence of an acid-acceptor. The anion, X, is one derived from a strong minieral acid, including such anions as chloride, bromide, iodide, nitrate, sulfate, phosphate, and the like, or strong organic acids, including such anions as methanesulfonate, benzenesulfonate, and the like. The halides are preferred anions.

The acid-acceptor can be any basic substance which will neutralize the acid, HX, that is split out during the course of the reaction, and which will not otherwise interfere with the reaction. Inorganic bases, such as the alkali and alkaline earth metal hydroxides, carbonates and bicarbonates can be used. Preferred acid-acceptors are the alkali metal carbonates, viz, sodium carbonate or potassium carbonate.

A preferred method of preparing the secondary amines, R'NHC(R")(CH₂OH)₂, comprises reacting a 1,3-dihydroxy-2-lower-alkyl-2-propylamine or a 1,3-dihydroxy-2-hydroxymethyl-2-propylamine with between about one-third and one-half molar equivalent of alkyl ester, R'X. In this instance the excess starting amine acts as the acid-acceptor.

A method for preparing the tertiary amines of Formula I (R is lower-alkyl) comprises reacting the secondary amines, (R'NHC(R")(CH₂OH)₂, with a lower-alkyl ester, RX, under the same conditions described above.

Although the reaction can be conducted in the absence of a diluent, it is preferred to employ suitable chemically inert solvents, for example, lower-alkanols, as reaction media. Appreciable quantities of water are to be avoided in order to prevent hydrolysis of the alkyl or lower-alkyl ester. The reaction mixture is heated at a temperature between about 50° and 200° C., conveniently at the reflux temperature of the inert solvent.

The compounds used in the practice of the instant invention are the bases of Formula I and the acid-addition salts of said bases, and said acid-addition salts are considered to be the full equivalents of the free bases. The compounds of Formula I in the free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates and alkali metal bicarbonates. The bases thus regenerated can then be interacted with the same or a different acid to give back the same or a different acid-addition salt. Thus the bases and all of their acid-addition salts are readily interconvertible.

It will thus be appreciated that Formula I not only represents the structural configuration of the bases useful in the practice of my invention but is also representative of the structural entity which is common to all of the compounds, whether in the form of the free bases or in the form of the acid-addition salts of the bases. I have found that by virtue of this common structural entity, the bases and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side effects ascribable to the anions.

In utilizing this pharmacodynamic activity of the salts of the invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding phramaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, the salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition salts of the bases are useful and valuable compounds, regardless of considerations of solubility, toxicity, physical form, and the like, and are accordingly within the purview of the instant invention.

The novel feature of the compounds of the invention, then, resides in the concept of the bases and cationic forms thereof and not in any particular acid or acid anion associated with the salt forms of the compounds; rather, the acid anions which can be associated in the salt forms are in themselves neither novel nor critical and therefore can be any acid anion or acid-like substance capable of salt formation with bases. In fact in aqueous solutions, the base form or water-soluble acid-addition salt form of the compounds both possess a common protonated cation or ammonium ion.

Thus the acid-addition salts discussed above are prepared from any organic acid, inorganic acid (including organic acids having an inorganic group therein), or organometallic acid, organic mono- and polysulfonic and -sulfinic acids, organic phosphonic and phosphinic acids, organic acids of arsenic and antimony, organic heterocyclic carboxylic, sulfonic, and sulfinic acids, acidic ion-exchange resins, and inorganic acids of any acid-forming element or combination of elements. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds and acidic compounds having "activated" or acidic hydrogen atoms, as for example, picrolonic acid, or barbituric acid derivatives having an acidic proton. Also comprehended as salt forming agents are so-called Lewis acids which lack a pair of electrons in the outer electron shell and react with basic compounds having an unshared pair of electrons to form salts, for example boron trifluoride.

Thus appropriate acid-addition salts are those derived from such diverse acids are formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, p-aminophenylarsinic acid, phenylstibnic acid, phenylphosphinous acid, methylphosphonic acid, phenylphosphinic acid, Amberlite® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphorbic acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The structures of the compounds used in the practice of the invention are established by the mode of synthesis and corroborated by the correspondence between calculated values for the elements and values found by chemical analysis.

The following examples will further illustrate the invention without being limited thereto.

EXAMPLE 1

N-(n-dodecyl)-1,3-dihydroxy-2-methyl-2-propylamine
[I: R is H; R' is $CH_3(CH_2)_{11}$; R" is $CH_3$]

A mixture of 52.26 g. (0.20 mole) of n-dodecyl bromide and 52.5 g. (0.50 mole) of 1,3-dihydroxy-2-methyl-2-propylamine in 500 ml. of n-butanol was refluxed for 72 hours. The reaction mixture was concentrated in vacuo, the residual oil was poured into 2 liters of cold water, and the solid which separated was collected, dried, and recrystallized once from ethanol and twice from acetone to give 24.75 g. of N-(n-dodecyl)-1,3-dihydroxy-2-methyl-2-propylamine, M.P. 50.8–53.6° C. (corr.).

EXAMPLE 2

N - (n - dodecyl) - N - methyl - 1,3 - dihydroxy - 2 - ethyl-2-propylamine [I: R is $CH_3$; R' is $CH_3(CH_2)_{11}$; R" is $C_2H_5$]

A mixture of 34.8 g. (0.125 mole) of N-(n-dodecyl)-1,3-dihydroxy-2-ethyl-2-propylamine, 21.3 g. (0.15 mole) of methyl iodide, and 25.0 g. (0.25 mole) of potassium bicarbonate in 75 ml. of absolute ethanol was heated under reflux for 24 hours. The insoluble inorganic material was removed by filtration, the filtrate was taken to dryness, and the residual oil was distilled in vacuo, the fraction boiling at 147–152° C./0.0025 mm. being collected as product. There was thus obtained 21.4 g. of N - (n - dodecyl) - N - methyl - 1,3 - dihydroxy - 2 - ethyl-2-propylamine, $n_D^{25}=1.4686$.

EXAMPLES 3–43

The following compounds of Formula I listed below in Table 1 can be prepared from an appropriate alkyl halide and 1,3-dihydroxy-2-lower-alkyl-2-propylamine or 1,3-dihydroxy-2-hydroxymethyl-2-propylamine (to prepare the secondary amines where R is H) using the manipulative procedure described above in Example 1. The tertiary amines where R is lower-alkyl and R' is alkyl can be prepared either from an appropriate lower-alkyl halide and N-alkyl-1,3-dihydroxy-2-lower-alkyl-2-propylamine or N-alkyl-1,3-dihydroxy-2-hydroxymethyl-2-propylamine using the manipulative procedure described above in Example 2 or by other procedures well-known to those skilled in the art of chemistry. All melting points are corrected.

TABLE 1

| Example | R | R' | R'' | M.P. (or B.P.) | Crystd. from— |
|---|---|---|---|---|---|
| 3 | H | $CH_3(CH_2)_9$ | $C_2H_5$ | 135–144.5° C./0.0005 mm. $n_D^{25}=1.4692$. | |
| 4 | H | $CH_3(CH_2)_{11}$ | $C_2H_5$ | 32.4–33.2° C | Acetone. |
| 5 | H | $CH_3(CH_2)_{13}$ | $CH_3$ | 55.4–57.6° C | Do. |
| 6 | H | $CH_3(CH_2)_{13}$ | $C_2H_5$ | 42.6–43.8° C | Do. |
| 7 | H | $CH_3(CH_2)_{15}$ | $CH_3$ | 62.2–64.4° C | Ethanol. |
| 8 | H | $CH_3(CH_2)_{15}$ | $C_2H_5$ | 48.8–50.0° C | Acetone. |
| 9 | $C_2H_5$ | $CH_3(CH_2)_{11}$ | $CH_3$ | 134° C./0.0001 mm. 82.6–85.6° C.(¹) | |
| 10 | $C_2H_5$ | $CH_3(CH_2)_9$ | $CH_3$ | 82.4–84.0° C.(¹) | Do. |
| 11 | $C_2H_5$ | $CH_3(CH_2)_{13}$ | $CH_3$ | 30.3–32.7° C 86.4–89.0° C.(¹) | Ethyl acetate. |
| 12 | $C_2H_5$ | $CH_3(CH_2)_{15}$ | $CH_3$ | 79.0–82.6° C.(²) 40.0–41.8° C | Do. |
| 13 | $CH_3$ | $CH_3(CH_2)_{11}$ | $CH_3$ | 56.6–58.8° C | Methanol. |
| 14 | $CH_3(CH_2)_2$ | $CH_3(CH_2)_9$ | $C_2H_5$ | 125–137° C./0.005 mm. $n_D^{25}=1.4680$. | |
| 15 | $CH_3(CH_2)_3$ | $CH_3(CH_2)_9$ | $C_2H_5$ | 124–130° C./0.0002 mm. $n_D^{25}=1.4678$. 95.6–99.0° C.(¹) | |
| 16 | $CH_3(CH_2)_2$ | $CH_3(CH_2)_{11}$ | $CH_3$ | 146–8° C./0.0005 mm. $n_D^{25}=1.4660$. | |
| 17 | $CH_3(CH_2)_3$ | $CH_3(CH_2)_{11}$ | $CH_3$ | 149–160° C./0.0006 mm. $n_D^{25}=1.4658$. 76.8–82.0° C.(³) | |
| 18 | $CH_3(CH_2)_2$ | $CH_3(CH_2)_{11}$ | $C_2H_5$ | 140–154° C./0.0015 mm. $n_D^{25}=1.4679$. | |
| 19 | $CH_3(CH_2)_3$ | $CH_3(CH_2)_{11}$ | $C_2H_5$ | 152–157° C./0.0002 mm. $n_D^{25}=1.4680$. | |
| 20 | $CH_3$ | $CH_3(CH_2)_{13}$ | $CH_3$ | 159.8–161.2° C | Do. |
| 21 | $CH_3(CH_2)_2$ | $CH_3(CH_2)_{13}$ | $CH_3$ | 135–142° C./0.0002 mm. $n_D^{25}=1.4667$. | |
| 22 | $CH_3(CH_2)_3$ | $CH_3(CH_2)_{13}$ | $CH_3$ | 150–155° C./0.0003 mm. $n_D^{25}=1.4662$. | |
| 23 | $CH_3$ | $CH_3(CH_2)_{13}$ | $C_2H_5$ | 51.8–53.8° C | Acetone. |
| 24 | $C_2H_5$ | $CH_3(CH_2)_{13}$ | $C_2H_5$ | 160–166° C./0.002 mm. $n_D^{25}=1.4690$. | |
| 25 | $CH_3(CH_2)_2$ | $CH_3(CH_2)_{13}$ | $C_2H_5$ | 145–152° C./0.0005 mm. $n_D^{25}=1.4682$. | |
| 26 | $CH_3(CH_2)_3$ | $CH_3(CH_2)_{13}$ | $C_2H_5$ | 133–7° C./0.0003 mm. $n_D^{25}=1.4675$. | |
| 27 | $CH_3$ | $CH_3(CH_2)_{15}$ | $CH_3$ | 58.2–60.2° C | Do. |
| 28 | $C_2H_5$ | $CH_3(CH_2)_{11}$ | $C_2H_5$ | 145–152° C./0.0012 mm. $n_D^{25}=1.4679$. | |
| 29 | H | $CH_3(CH_2)_{11}$ | $CH_2OH$ | 92.0–95.2° C | Ethanol. |
| 30 | H | $CH_3(CH_2)_{13}$ | $CH_2OH$ | 92.4–95.2° C | Do. |
| 31 | H | $CH_3(CH_2)_{15}$ | $CH_2OH$ | 90.0–93.8° C | Do. |
| 32 | $CH_3$ | $CH_3(CH_2)_{11}$ | $CH_2OH$ | 100.0–100.8° C 91.8–92.6° C.(⁴) | Methanol. |
| 33 | $CH_3$ | $CH_3(CH_2)_{13}$ | $CH_2OH$ | 97.8–98.8° C | Acetone. |
| 34 | $CH_3$ | $CH_3(CH_2)_{15}$ | $CH_2OH$ | 97.0–99.8° C | Methanol. |
| 35 | $C_2H_5$ | $CH_3(CH_2)_9$ | $CH_2OH$ | 40.0–41.0° C | Hexane. |
| 36 | $C_2H_5$ | $CH_3(CH_2)_{13}$ | $CH_2OH$ | 55.0–56.6° C | Acetone. |
| 37 | $C_2H_5$ | $CH_3(CH_2)_{15}$ | $CH_2OH$ | 57.2–61.2° C | Do. |
| 38 | $CH_3(CH_2)_2$ | $CH_3(CH_2)_9$ | $CH_2OH$ | 91.6–97.0° C.(¹) | Do. |
| 39 | $CH_3(CH_2)_2$ | $CH_3(CH_2)_{11}$ | $CH_2OH$ | 50.4–53.2° C | Do. |
| 40 | $(CH_3)_2CH$ | $CH_3(CH_2)_{11}$ | $CH_2OH$ | 70.0–71.6° C | Methanol. |
| 41 | $CH_3(CH_2)_3$ | $CH_3(CH_2)_9$ | $CH_2OH$ | 65.4–68.4° C.(¹) | Ethyl acetate. |
| 42 | $CH_3(CH_2)_3$ | $CH_3(CH_2)_{11}$ | $CH_2OH$ | 41.0–45.4° C | Pentane. |
| 43 | $CH_3(CH_2)_3$ | $CH_3(CH_2)_{13}$ | $CH_2OH$ | 48.4–50.2° C | Do. |

¹ Hydrochloride salt.
² Cyclohexylsulfamate salt.
³ Mucate salt.
⁴ Laurate salt.

The compounds are formulated for use by dissolving, under sterile conditions, a salt form of the compounds in water (or an equivalent amount of a nontoxic acid if the free base is used), or in a physiologically compatible aqueous medium such as saline, and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared.

The weight reduction activity of the compounds was determined in rats as follows:

The test compounds were administered by stomach tube at doses of 10, 20, and 40 mg./kg. to groups of five male rats at each dose level, and control groups were run concurrently. The controls were medicated with either water or one percent gum tragacanth depending on the vehicle used for the test compound. Food and water were available to all animals ad libitum, and the tests were run over a period of ten days.

Body weight was recorded each day and the mean body weight of each group and the percent change from the initial medication day were calculated. If the test compound depressed the gain in body weight by more than four times the standard error of the control group, the compound was considered to be active, and if the depression in growth was between three and two times the standard error, the compound was considered to be moderately active. Losses in weight between one and two times the standard error were considered questionable and lesser changes insignificant.

The weight reducing activities so determined for representative compounds of the invention are given below in Table 2. The example numbers refer to the example above wherein the preparation of the compounds are described. The symbols ++ and + before the doses in the table represent doses at which the compounds are considered to be active and moderately active, respectively, these terms having the above-described meanings.

Table 2

| Example: | Activity |
|---|---|
| 3 | ++40 mg./kg. |
| 3 | ++10, 20, 40 mg./kg. |
| 5 | ++40 mg./kg. |
| 6 | +40 mg./kg. |
| 7 | ++40 mg./kg. |
| 9 | ++40 mg./kg.;+20 mg./kg. |
| 10 | ++10, 20 mg./kg. |
| 11 | ++20, 40 mg./kg.;+10 mg./kg. |
| 13 | ++10, 20, 40 mg./kg. |
| 14 | ++10, 40 mg./kg.;+20 mg./kg. |
| 15 | +40 mg./kg.;+20 mg./kg. |
| 16 | +40 mg./kg.;++10 mg./kg. |
| 18 | ++40 mg./kg. |
| 22 | ++40 mg./kg. |
| 24 | ++40 mg./kg. |
| 25 | ++10 mg./kg. |
| 26 | ++20, 40 mg./kg.;+10 mg./kg. |
| 37 | ++40 mg./kg. |

The subject matter which I regard as my invention is particularly pointed out and distinctly claimed as follows:

1. A process for weight reduction in mammals which comprises administering to a mammal a weight-reducing amount of N-alkylated-1,3-dihydroxy-2 - lower-alkyl - 2-propylamine wherein the lower-alkyl group contains from one to four carbon atoms and the total number of carbon atoms in the compound is between 14 and 27, inclusive.

2. A process for weight reduction in mammals which comprises administering to a mammal a weight-reducing amount of N-alkylated-1,3-dihydroxy-2-hydroxy-methyl-2-propylamine wherein the total number of carbon atoms in the compound is between 14 and 27, inclusive.

3. A process for weight reduction in mammals which comprises administering to a mammal a weight-reducing amount of a compound of the formula:

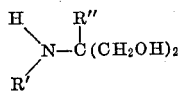

where $R'$ represents alkyl, $R''$ represents lower-alkyl, and the sum of the number of carbon atoms in $R'$ and $R''$ is between 11 and 20, inclusive.

4. A process for weight reduction in mammals which comprises administering to a mammal a weight-reducing amount of a compound of the formula:

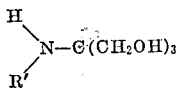

where $R'$ represents alkyl containing from 10 to 16 carbon atoms.

5. A process for weight reduction in mammals which comprises administering to a mammal a weight-reducing amount of a compound of the formula:

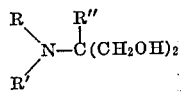

where $R'$ represents alkyl, $R$ and $R''$ represent lower-alkyl, and the sum of the number of carbon atoms in $R$, $R'$, and $R''$ is between 12 and 24, inclusive.

6. A process for weight reduction in mammals which comprises administering to a mammal a weight-reducing amount of a compound of the formula:

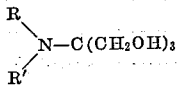

where $R$ represents lower alkyl, $R'$ represents alkyl, and the sum of the number of carbon atoms in $R$ and $R'$ is between 11 and 20, inclusive.

7. A process for weight reduction in mammals which comprises administering to a mammal a weight-reducing amount of N-(n-dodecyl)-1,3-dihydroxy-2-ethyl-2-propylamine.

8. A process for weight reduction in mammals which comprises administering to a mammal a weight-reducing amount of N-(n-dodecyl)-N-ethyl-1,3-dihydroxy-2-methyl-2-propylamine.

9. A process for weight reduction in mammals which comprises administering to a mammal a weight-reducing amount of N-(n-decyl)-N-ethyl-1,3-dihydroxy-2-methyl-2-propylamine.

10. A process for weight reduction in mammals which comprises administering to a mammal a weight-reducing amount of N-(n-tetradecyl)-N-ethyl-1,3-dihydroxy-2-methyl-2-propylamine.

11. A process for weight reduction in mammals which comprises administering to a mammal a weight-reducing amount of N-(n-decyl)-N-(n-propyl)-1,3-dihydroxy-2-ethyl-2-propylamine.

12. A process for weight reduction in mammals which comprises administering to a mammal a weight-reducing amount of N-(n-decyl)-N-(n-butyl)-1,3-dihydroxy-2-ethyl-2-propylamine.

13. A process for weight reduction in mammals which comprises administering to a mammal a weight-reducing amount of N-(n-tetradecyl)-N-(n-butyl)-1,3-dihydroxy-2-ethyl-2-propylamine.

References Cited

UNITED STATES PATENTS 2,964,530  12/1960  Zenitz _____ 260—307

ALBERT T. MEYERS, *Primary Examiner.*

J. D. GOLDBERG, *Assistant Examiner.*

UNITED STATES PATENT OFFICE
CERTIFICATE OF CORRECTION

Patent No. 3,432,603                                March 11, 1969

Bernard L. Zenitz

It is certified that error appears in the above identified patent and that said Letters Patent are hereby corrected as shown below:

Column 1, line 17, "pyropylamine" should read -- propylamine --; line 45, "by" should read -- be --. Column 2, line 4, "minieral" should read -- mineral --. Columns 5 and 6, TABLE 1, third column, line 31 thereof, "$CH_2(CH_2)_{13}$" should read -- $CH_3(CH_2)_{13}$ --. Column 7, line 4, "Example 3" should read -- Example 4 --.

Signed and sealed this 14th day of April 1970.

(SEAL)

Attest:

Edward M. Fletcher, Jr.

Attesting Officer

WILLIAM E. SCHUYLER, JR.

Commissioner of Patents